United States Patent [19]

Kobayashi

[11] Patent Number: 5,608,851
[45] Date of Patent: Mar. 4, 1997

[54] COLOR VARIATION SPECIFICATION METHOD AND A DEVICE THEREFOR

[75] Inventor: Yuichi Kobayashi, Tokyo, Japan

[73] Assignee: Toppan Printing Co., Ltd., Tokyo, Japan

[21] Appl. No.: 27,848

[22] Filed: Mar. 8, 1993

[30] Foreign Application Priority Data

Jun. 17, 1992 [JP] Japan .................................. 4-158352
Jun. 19, 1992 [JP] Japan .................................. 4-161445

[51] Int. Cl.$^6$ ................................................ G06T 11/00
[52] U.S. Cl. ................................................ 395/131
[58] Field of Search .................................. 358/518–522, 358/457; 364/526, 571.07, 581, 173; 395/129–132; 382/16–18

[56] References Cited

U.S. PATENT DOCUMENTS

| | | | |
|---|---|---|---|
| 4,488,245 | 12/1984 | Dalke et al. | 364/526 |
| 4,689,669 | 8/1987 | Hoshino et al. | 358/80 |
| 4,907,075 | 3/1990 | Braudaway | 358/75 |
| 4,965,745 | 10/1990 | Economy et al. | 364/518 |
| 4,991,122 | 2/1991 | Sanders | 364/521 |
| 5,047,842 | 9/1991 | Bouman, Jr. et al. | 358/75 |
| 5,119,186 | 6/1992 | Deacon et al. | 358/78 |
| 5,278,678 | 1/1994 | Harrington | 358/518 |

OTHER PUBLICATIONS

Nobuyuki Otsu, "An Automatic Threshold Selection Method Based on Discriminant and Least Squares Criteria", The Transactions of the IECE of Japan vol. E 63. No. 4 Apr. 1980.

Nobuyuki Otsu, "A Threshold Selection Method from Gray–Level Histograms", IEEE Transactions on Systems, Man and Cybernetics, vol. SMC–9, No. 1 Jan. 1979.

*Primary Examiner*—Almis R. Jankus
*Attorney, Agent, or Firm*—Staas & Halsey

[57] ABSTRACT

The present invention relates to a method and device for the determination of restricted colors by a means where, for example, image data displayed by means of approximately 16,000,000 colors is displayed in terms of a restricted number of colors. For example, in the case of 256 colors, an image is displayed in more natural colors. Furthermore, the present invention relates to a method and a device for the prevention of the generation of pseudo color contouring by means of specifying, in advance, portions in which the color variation is loose from the periodicity of the values appearing in the subordinate bits of each picture element at the time of the specification of display colors, and allocating a large number of display colors to portions having loose color variation. In addition, the present invention relates to a method and device which, by means of disposing each picture element of the image data in a uniform color space and conducting a discriminant analysis with respect to the distribution of the picture elements in this color space, determines ranking numbers with respect to the coordinate axes of the chromaticity component of the uniform color space and ranking numbers with respect to the coordinate axis of the brightness component in accordance with the distribution of the colors of the image data at the time of the restriction of the display colors, and thus determines the representative colors.

16 Claims, 4 Drawing Sheets

COLOR VARIATION SPECIFICATION METHOD AND A DEVICE THEREFOR

BACKGROUND OF THE INVENTION

1. Field of the Invention

The present invention relates to a color variation specification method, restricted color determination method, and restricted color determination device which are used when a digitized natural image is displayed on a color display device which is capable of simultaneously displaying only a small number of colors.

2. Background Art

In general, color images used in color display devices are displayed in terms of RGB color components; 8 bits of memory are allocated to each color component and digitization is thus conducted. Accordingly, in a full-color display which displays the above digitized color image, it is possible to simultaneously display a number of colors corresponding to 24 bits with respect to each picture element, that is to say, to display $2^{24}$ colors so that it is possible to display an image with a natural look.

In contrast, in the world of CD-ROM and CD-I, CAD (Computer Aided Design), CAI (Computer Assisted Instruction), and graphics, it is frequently the case that a color display device which is capable of simultaneously displaying only a limited number of colors selected from among these $2^{24}$ colors, is used. In such a case, the capacity of the image memory corresponding to a picture element is normally 8 bits or fewer, so that the number of colors which can be simultaneously displayed is $2^8=256$.

In addition, if the number of colors is limited to 256 or fewer, it is difficult to display a natural image without deterioration. Therefore there has been a great demand for a device which will make such a display possible.

Furthermore, with regard to the data capacity of the above display device or the like, there has been a great demand for a reduction in the amount of image data and the number of colors of the natural image so that the natural image will not suffer deterioration.

Conventionally, there are known methods which have attempted to solve the problems where a natural image was displayed in terms of a restricted number of colors, while controlling visual degradation by means of a color map display in which a small number of display colors were selected from a large number of colors and displayed.

For example, in the case in which colors were displayed in terms of values for each of the 3 colors R, G, and B, a space in which a 3-dimensional rectangular coordinate system using as coordinates thereof the values for each of R, G, and B, was expressed and used as a color space in such a method. In this color space, each picture element of the color image data was given coordinates corresponding to its RGB values, and an analysis of the distribution of the colors of each picture element included in the color image data was conducted.

Furthermore, a large number of display colors was selected from color regions within the color space for which the distribution of the picture elements of the color image data was large, and a small number of display colors was selected from color regions in which the distribution of the picture elements of the color image data was small. The selected display colors were recorded on a color map, and the closest display color was allocated to each picture element of the color image data as a representative color. Then, by means of writing the color code, recorded as the representative color at the position of each picture element of the image memory into a color map, an approximation of the image was displayed.

Among methods for the selection of representative colors as described above, an example thereof is a method using Otsu's discriminant analysis Shingakuron (THE TRANSACTIONS OF THE IECE OF JAPAN) (D).J63-D, pp. 349–356, 1980-4, and the English abstracts thereof, THE TRANSACTIONS OF THE IECE OF JAPAN, VOL. E63, NO. 4, APRIL 1980, pp. 327–328.

Furthermore, among color spaces, there exist not merely color spaces which express colors by means of combining the three primary colors RGB, but also by means of using uniform color spaces such as the CIELUV color space, CIELAB color space, and the like [recommended by the CIE (Commission Internationale de l'Eclairage)] which take into consideration the visual characteristics of color discrimination by human beings. In addition, it is possible to conduct the above-described discriminatory method of analysis using these color spaces.

Furthermore, a method which utilizes the visual characteristics of color discrimination by human beings, and furthermore applies the Dither method (Journal of the Electronic Imaging Conference, Vol. 18, No. 5 (1989) pp. 293–301; Tajima, Ikeda) has been proposed. However, in this method, consideration is not given to the case in which restricted color display is conducted using a small number of colors, for example, fewer than 100.

In restricted color determination methods utilizing a conventional discriminatory method of analysis, the color distribution was analyzed and a large number of display colors was selected from color regions having a large distribution, while a small number of display colors was selected from color regions having a small distribution, and the closest representative color was allocated to each picture element. In the case in which representative colors were determined and in which portions in the variations of the colors (the values for each of R, G, and B) in each picture element were loose, it was possible to represent the colors of each picture element by means of a small number of representative colors using this method. However, in such a case, pseudo color contouring was often generated. What is meant here by "pseudo color contouring" is a phenomenon in which quantization errors, occurring in portions of the image in which the brightness gradient is loose, have the appearance of contour lines on a map, and thus present a large flaw in the image when displayed (Image Processing Handbook, Image Processing Editing Committee, Shokodo, 1988, p. 191).

For this reason, it was necessary to visually select the portions in which the color variation was loose, to conduct processing of these portions which was separate from that of the other image portions, and for an operator to manually make the corrections at the locations where the pseudo color contouring had occurred after discriminant analysis. Therefore, the process to eliminate pseudo color contouring was extremely burdensome.

Furthermore, in the conventional technology which used the above-described Dither method, a Dithering process was adopted which conducted the appropriate weighting of regions in which the color difference between picture elements in a certain vicinity was small. However, in this Dithering process, only an exchange of colors of each picture element within a predetermined range of colors was conducted, so that while pseudo color contouring was controlled, a diffusion of color occurred with respect to the image as a whole.

Furthermore, even when the discriminatory method of analysis was used in a CIELUV color space or in a CIELAB color space, which take into account the visual characteristics of color discrimination by human beings, an image which approximated a natural image when viewed by the human eye could not be obtained.

Furthermore, among conventional methods and in addition to the non-adaptive methods such as the above-described discriminatory method of analysis and the like, in which an image was created by the selection of a limited amount of display colors independent of the state of the original image, for example, independent of the color distribution thereof, there also existed adaptive methods which selected a restricted number of colors so as to be adapted to the statistical characteristics of the color distribution and the like of the original image.

The above-described adaptive methods were superior to the non-adaptive methods with respect to image quality. However, it was necessary to determine color distribution and the like for all the image data, and it was also necessary to alter the method of statistical processing in accordance with the state of the color distribution so that the processing became complex overall, and the processing period became lengthy.

Accordingly, non-adaptive methods, which maintained a certain amount of image quality with respect to general image data, have been developed to a greater extent than the adaptive methods. The advantages to non-adaptive methods are that they are not particularly selective and that the processing period is short. However, among the natural images which furnish the image data, there are images which have statistical characteristics such as color distribution and the like, which differ extremely based on the content thereof so that the superiority of adaptive methods from the point of view of image quality remains unchallenged.

SUMMARY OF THE INVENTION

In view of the shortcomings of the technologies described above, the present invention provides a method for determining whether a portion in which the colors vary in a loose manner exists in the above described image data, by means of investigating whether periodicity exists at subordinate bits of the value of each picture element disposed in a connected manner in the image data.

Furthermore, the present invention provides a method for the allocation of the number of display colors of the image data at the time of the reduction, for example a number corresponding to 24 bits to a number corresponding to 8 bits or fewer, by means of the discriminant analysis of the values of each picture element of the image data of a large number of display colors, to color regions corresponding to the portions specified as having loose color variation by means of the above method, and for the display of the above-described image data by means of restricted display colors in a state in which the generation of pseudo color contouring is prevented.

Furthermore, the present invention provides a method for the allocation of a large number of display colors as a result of variations in brightness with respect to the chromaticities within the color components or, alternatively, for the display of image data by means of restricted display colors in correspondence with the tint characteristics of the image data, at the time of the reduction of display colors by means of discriminant analysis of the values of each picture element of the image data, as described above.

Furthermore, the present invention provides a device for displaying image data by means of restricted display colors using the methods described above.

DETAILED DESCRIPTION OF THE PREFERRED EMBODIMENTS

Hereinbelow, a preferred embodiment of the present invention will be explained with reference to the diagrams.

Figure 1:
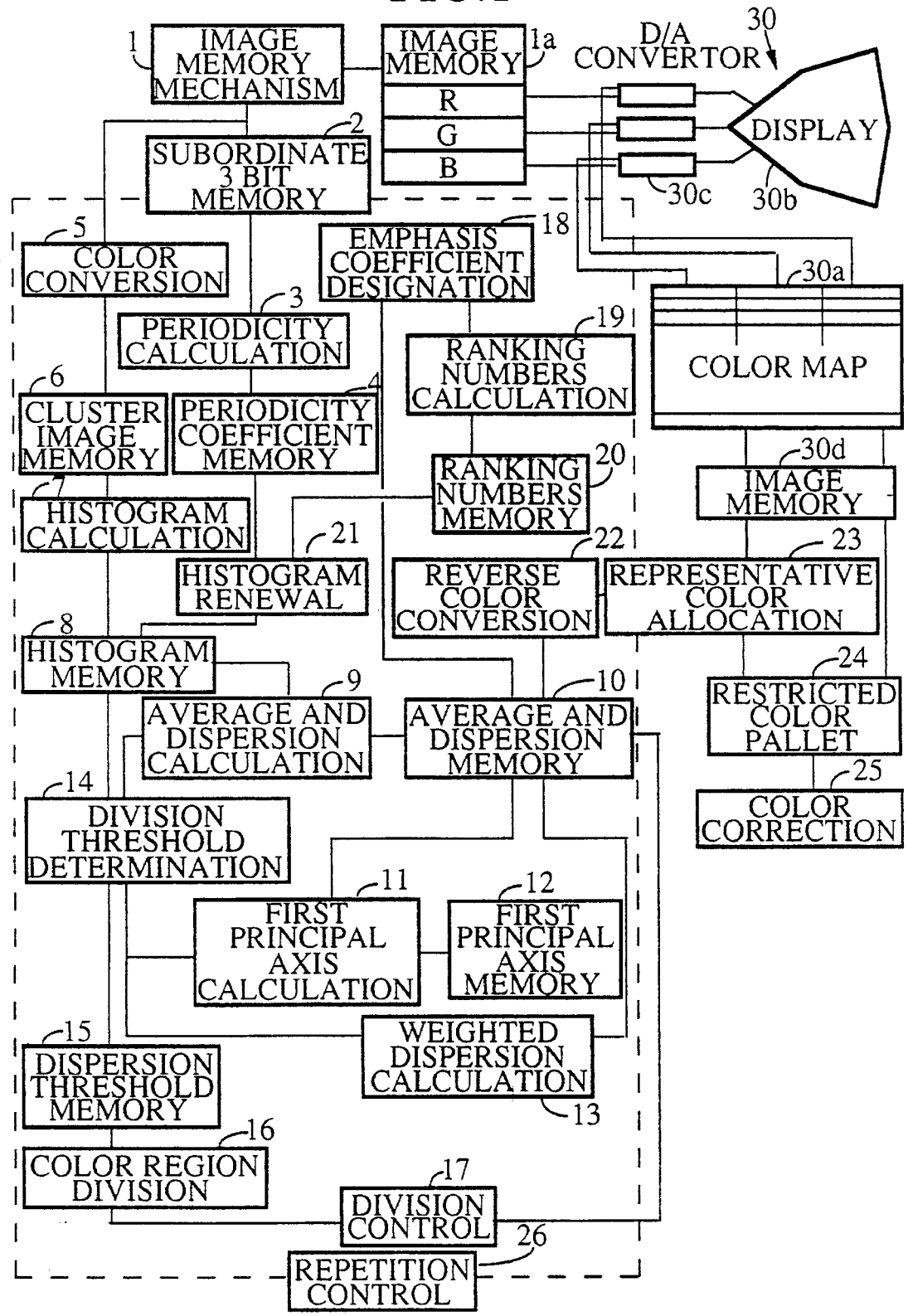
FIG. 1 is a block diagram showing the above-described restricted color determination device of the preferred embodiment.

FIG. 1 is a block diagram showing an apparatus for determining restricted color in accordance with the present preferred embodiment, while FIGS. 2 through 8 are diagrams for the purpose of explaining the restricted color determination method in accordance with the present preferred embodiment.

Hereinbelow, with reference to FIG. 1, an explanation will be given of the restricted color determination device in accordance with the present preferred embodiment.

The above-described restricted color determination device has a structure having as main components thereof: an image memory mechanism 1, which stores image data; a subordinate 3 bit memory mechanism 2, which stores the subordinate 3 bits of the above image data; a periodicity calculation mechanism 3 which, in the above subordinate 3 bit image data reads the subordinate 3 bit values of picture elements surrounding each picture element along radial directions; finds the periodicity of the subordinate 3 bits of the picture elements which were read, and normalizes this periodicity; a periodicity coefficient memory 4, which stores the periodicity which was normalized by means of the above-described periodicity calculation mechanism 3 as a coefficient; color conversion mechanism 5 which converts the above-described image data, which comprise RGB values, into values in a CIELAB color space; a cluster image memory mechanism 6 which finely differentiates the CIELAB color space into a plurality of clusters by means of the ranking numbers determined at the time at which the frequency distribution of each picture element along the L*, a*, and b* coordinate axes was found, assigns cluster numbers to these clusters, and stores the picture element values which have been converted into CIELAB values, replacing these values with the cluster numbers of the clusters containing these picture elements; a histogram calculation mechanism 7 which finds the frequency distribution of the picture elements of each cluster along each coordinate axis of the above-described CIELAB color space; a histogram memory mechanism 8 which stores the histograms which were thus determined; an average and dispersion calculation mechanism 9 which determines the average color and dispersion from the above-described histograms; an average and dispersion memory mechanism 10 which stores the averages and dispersions which were thus obtained; a first principal axis calculation mechanism 11 which finds a first principal axis; a first principal axis memory mechanism 12 which stores the first principal axis which was thus determined; a weighted dispersion calculation mechanism 13 which finds the weighted dispersion; a division threshold determination mechanism 14 which finds division thresholds by means of discriminant analysis; a dispersion threshold memory mechanism 15 which stores the dispersion thresholds which were thus obtained; a color region division mechanism 16 which conducts division into color regions by means of division thresholds in accordance with the above-described weighted distribution and first principal axis; a division control mechanism 17 which controls the repetition of the processing of each mechanism described above, to the point at which either color regions which can be divided no longer exist or the number of color regions into which the color space was divided reaches a preset number of display colors; an emphasis coefficient designation mechanism 18 which designates, prior to each division into color regions, the factor (1/8–32) ranking numbers on the coordinate axis showing the brightness component L*, in accordance with the dispersion ratios with respect to all coordinate axes of a CIELAB color space, which are to be multiplied, with respect to the ranking numbers in the coordinate axes showing the chromaticity components a* and b*; a ranking numbers calculation mechanism 19 which finds the ranking numbers of each coordinate axis by the means of the multiplying factor (emphasis coefficient) designated by means of the emphasis coefficient designation mechanism 18; a ranking numbers memory mechanism 20 which stores the ranking numbers of each coordinate axis determined by the ranking numbers calculation mechanism 19; a histogram renewal mechanism 21 which conducts the weighting revision of the above-described histogram read-out from histogram memory mechanism 8, by means of the periodicity coefficient read-out from the above-described periodicity coefficient memory mechanism 4, and updates the ranking numbers of the histogram to the ranking numbers stored in the above-described ranking numbers memory mechanism 20, rewrites the histogram, and stores the rewritten histogram in a histogram memory mechanism; a reverse color conversion mechanism 22 which reads the restricted colors obtained by the operations of each of the above mechanisms 2–21 from the average and dispersion memory mechanism, and conducts conversion which is the opposite of that of the color conversion mechanism 5; a representative color allocation mechanism 23 which replaces the colors of each picture element with restricted colors; a restricted color pallet mechanism 24 which sorts the above-described restricted colors by means of distance in the color space, and records the representative colors in a color map 30a; a color correction mechanism 25 which makes possible localized color correction on a screen on which image data which have been replaced by the above-described representative colors are displayed in close proximity; and a repetition control mechanism 26 which controls the repetition of the conducting of the operations of each of the above-described mechanisms 2–21 with respect to the restricted colors obtained by means of conducting the operations of each of the above-described mechanisms 2–21.

The image memory mechanism 1 possesses an image memory 10a, herein, the values (R, G, B) of each picture element of the image data are stored and each color component is allotted 8 bits.

The subordinate 3 bit memory mechanism 2 stores the subordinate 3 bits of the values (R, G, B) of each picture element of the image data stored in the image memory mechanism 1.

Periodicity calculation mechanism 3 reads the subordinate 3 bit data for each picture element out of the subordinate 3 bit memory mechanism 2; measures the frequency of the appearance of identical values, in cycles of less than 4 picture elements, in the subordinate 3 bits of picture elements in the image which are disposed in a connected manner in a vertical, horizontal, diagonal right, or diagonal left radial direction around each picture element; and by this means determines the periodic values described hereinafter for each picture element. Furthermore, this mechanism determines the proportion for each picture element as a periodicity coefficient, when the largest value of the periodic value is set to a value of 1.

Periodicity coefficient memory mechanism 4 stores the periodicity coefficients of each picture element an a array that is identical to that of the picture element.

Color conversion mechanism 5 converts the RGB values of each picture element in the image data to CIELAB color space coordinates.

Cluster image memory mechanism 6 finely differentiates the CIELAB color space into clusters by means of the rankings of each coordinate, replaces the value of the picture elements contained in each cluster with the cluster number, and stores these values.

Histogram calculation mechanism 7 determines the frequency distribution of each picture element belonging to each cluster and creates a histogram, and stores this in histogram memory mechanism 8.

Average and dispersion calculation mechanism 9 determines the average and dispersion of the picture element distribution for each coordinate axis in the CIELAB color space or the color regions into which the CIELAB color space was divided by means of thresholds.

The first principal axis calculation mechanism 11 determines the largest coordinate axis of the dispersion read out from the average and dispersion memory mechanism 10, in the CIELAB color space or in the color regions into which the CIELAB color space was divided by means of thresholds, and makes this coordinate axis a first principal axis.

The first principal axis obtained in this way is stored in the first principal axis memory mechanism 12.

The weighted dispersion calculation mechanism 13 determines a weighted dispersion by means of multiplying the dispersion by the relative frequency of the number of picture elements contained in the color regions, with respect to the total number of picture elements.

Division threshold determination mechanism 14 determines division thresholds by means of the above-described discriminant analysis.

Division threshold memory mechanism 15 stores the division thresholds which were obtained by means of the division threshold determination mechanism 14.

Color region division mechanism 16 sorts the weighted dispersion values of each region obtained by means of the weighted dispersion mechanism 13, finds the color region having the largest weighted dispersion, reads the first principal axis of this color region (in the case of the initial division, it is the color space) from the first principal axis memory mechanism 20, and divides this color region (i.e. color space) in 2 by means of the division threshold of the first principal axis which was read out of the division threshold memory mechanism 15.

Division control mechanism 17 controls the repetition of the above-described calculations and divisions with respect to each color region, until a point at which the total number of color regions into which the color space was divided by means of the color region division mechanism 16 reaches a preset number of colors or further division cannot be conducted.

After the above division has been completed, representative color allocation mechanism 23 reads the average color for each color region out of the average and dispersion memory mechanism 10, and adopts this average color as the representative color for each color region. Furthermore, in the original image data, representative color allocation mechanism 23 allocates the average color of each color region to the picture elements which are contained in that color region, and replaces the color of the picture elements of the original image data with the representative color. The image data, which now have the color of each picture element replaced by the representative color, are stored in image memory 30d.

With respect to the dispersion of each coordinate axis of the CIELAB color space determined by means of average and dispersion calculation mechanism 9, emphasis coefficient designation mechanism 18 determines a ratio between each of the coordinate axes, and designates multiplying factors so that the ranking numbers on each of the coordinate axes are multiplied by ⅛, ¼, ½, 2, 4, 8, 16, or 32, with respect to other coordinate axes, in accordance with the above ratio.

Emphasis coefficient calculation mechanism 19 determines the ranking numbers on each coordinate axis in accordance with the above ratio.

Emphasis coefficient memory mechanism 20 stores the ranking numbers of each coordinate axis obtained by means of the ranking numbers calculation mechanism 19.

Histogram renewal mechanism 21 totals the periodicity coefficients of each picture element read out of the periodicity coefficient memory mechanism 4 for each cluster in which the corresponding picture elements are included, and adds the periodicity coefficients totaled by cluster to the number of picture elements in each cluster of a histogram.

Furthermore, histogram renewal mechanism 21 redivides the CIELAB color space into new clusters, which are different from the above-described clusters, on the basis of the ranking numbers of each coordinate axis stored in the above-described ranking numbers memory mechanism 20, and updates the above-described histogram to the number of picture elements of each new cluster resulting from this redivision.

That is to say, the CIELAB color space is divided into new clusters in accordance with the multiplication factors designated by the above-described emphasis coefficient designation mechanism 18, and based on these new clusters, the histogram is renewed. Accordingly, when a brightness coefficient is to be emphasized by a multiplication factor designated by the emphasis coefficient designation mechanism 18, in addition to the weighting revision by means of the above-described periodicity coefficients and after the CIELAB color space has been divided into new clusters, the sum of the periodicity coefficients is determined for each new cluster. The histogram, based on the new clusters, is weighted by the sum of the periodicity coefficients of each new cluster and is thus corrected.

In addition, histogram renewal mechanism 21 rewrites the histogram renewed in the above manner in place of the histogram stored in histogram memory 8.

Restricted color pallet calculation mechanism 24 sorts the representative colors obtained, by means of the operation of each of the above mechanisms by distance in the color space and records the representative colors as color codes in the color map 30a.

In addition, color correction mechanism 25 operates in the following manner: colors of the displayed image are surrounded with a rectangle by means of a mouse, and by placing the focus of the mouse on portions having colors which are to be changed within the rectangle and clicking, it is possible to select places or colors in the displayed image which are to be corrected.

Furthermore, in the case in which colors selected by means of the color correction mechanism 25 are to be corrected and modified, there are two methods therefor; in one method, the colors which have been selected as described above are replaced by other representative colors which are recorded in the color map 30a described above. That is to say, after colors which are to be modified have been selected, color correction mechanism 25 displays the representative colors recorded in color map 30a as a color palette screen. Furthermore, the color palette screen thus displayed displays colors having a small mutual color difference in the uniform color space so as to adjoin each other, and the representative colors which have been selected as described above and are to be modified are displayed in a flashing manner.

In addition, for example, by means of finding representative colors which approximate the representative colors which are to be modified in the color palette screen, and designating these representative colors on the color palette screen, it is possible to replace the representative colors which are to be modified with the designated representative colors. That is to say, it is possible to replace the representative colors of the area of the displayed image designated by means of the mouse with other representative colors.

In this case, only the color of the area of the displayed image which was originally designated by means of the mouse is replaced with one previously determined representative color.

In another color correction and modification method, the representative colors recorded in color map 30a are modified; after representative colors which are to be modified have been selected as described above, the color palette screen is displayed, and the selected colors are displayed in a flashing manner. Furthermore, in addition to the above-described color palette screen, a 24-bit full-color color palette is displayed. Then, in the case of this correction method, the colors which have been selected from the above representative color color palette are replaced with colors in the full-color color palette designated by means of the mouse.

That is to say, by means of conducting the above operations, with respect to the selected representative colors, the data of color map 30a themselves are modified, and in the displayed image, in portions which use representative colors which are identical to the selected representative colors, even if these portions are outside the area which was designated by means of the mouse, all colors are modified.

The restricted color determination device having the above structure displays full color image data on a color map display device 30 using restricted display colors and utilizing a restricted color determination method.

In the present preferred embodiment, the color map display device 30 is capable of displaying the image data stored in the image memory mechanism in full color; by visually comparing the full color image and the image displayed in restricted colors, it is possible to correct the colors using the above-described color correction mechanism 28. Reference numeral 30c indicates a D/A convertor for the purpose of displaying on display 30b the image data of the image memories 10a and 30d.

Next, the restricted color determination method used by this restricted color determination device will be explained.

(1) Measurement of Chromaticity Variation of the Image Data which are to be Displayed In conventional methods, when a measurement was made of the degree of variation in the colors of the image data, that is to say, when measurements were made as to whether the colors of each picture element in the image differed greatly from the colors of the picture elements in the vicinity, or whether these colors were roughly equivalent, a measurement method which used the superordinate 5 bits of the RGB data of the image displayed in terms of 8 bits for each of R, G, and B was employed.

However, the data which exhibited the looseness of the color variation were usually included in the subordinate 3 bits which were lost by means of this method. That is to say, in image data having a small color variation, it was impossible to measure the chromaticity variation by comparing the superordinate bits of each picture element, so that it was impossible to distinguish portions in which the color variation was extremely loose from portions in which the color variation was somewhat loose.

In the present preferred embodiment, by means of determining the periodicity of the values of the subordinate 3 bits in each color component, it is possible to specify the looseness of the color variation in the image data which are to be displayed.

The values of the subordinate 3 bits are limited to the 8 possibilities from 0 to 7. In the case in which color variation is loose as a result of differences in position of each picture element of the image, the data values of each picture element change continuously with a small amount of fluctuation between picture elements which are disposed in a connected manner. Accordingly, in portions having a loose color variation, a fixed threshold appears almost as a rule within the range from 0 to 7 of the subordinate 3 bits.

Figure 2:
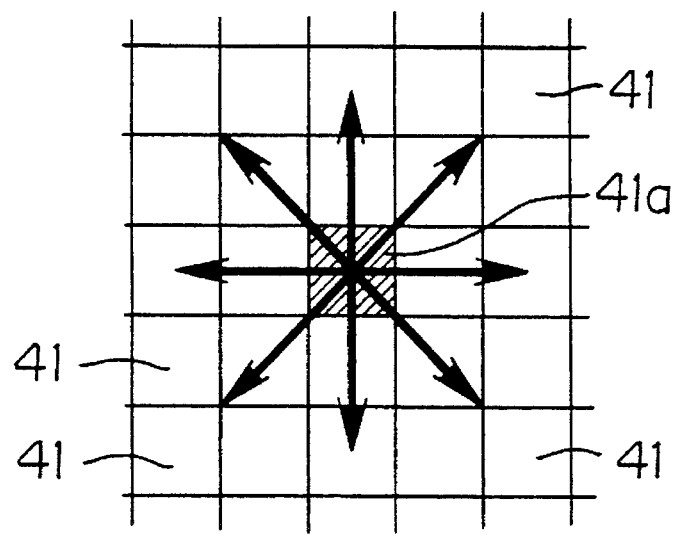
FIG. 2 is a diagram which serves to explain the restricted color determination method of the above preferred embodiment.

In the present preferred embodiment, as shown in FIG. 2, using each picture element 41 as a central point, the periodicity calculation mechanism 3 reads the subordinate 3 bits (those stored in subordinate 3 bit memory mechanism 2) of the picture elements disposed in a connected manner in the 8 radial directions: vertical (up, down), horizontal (left, right), diagonal left (left upward, right downward), and diagonal right (right upward, left downward). Periodicity calculation mechanism 3 then determines the regularity (periodicity) for each RGB color component.

Figure 3:
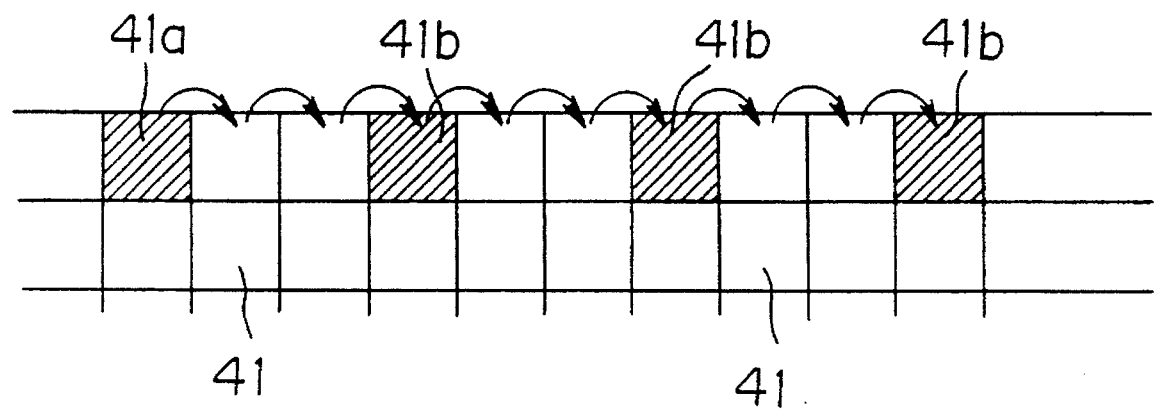
FIG. 3 is a diagram which serves to explain the above restricted color determination method.

As shown in FIG. 3, in the concrete periodicity calculation method of the periodicity calculation mechanism 3, first, the value of the subordinate 3 bits of the digital data of picture elements 41 is read, while moving regularly in the above described directions for one picture element at a time, until values which are equal to the values of the subordinate bits of an object picture element 41a are discovered. Then, when the number of picture elements moved prior to the discovery of equivalent values is less than 4, the subordinate 3 bits are read while moving in a continuous manner to neighboring picture elements until identical values are discovered. If the number of picture elements moved when the latter identical values were discovered is equal to the number of picture elements moved originally, it is determined that the object picture element 41a possesses periodicity.

Then, while the same values appear periodically with the same number of moves, the subordinate 3 bits of the color data of picture elements 41 are read while moving in the above-described directions. Furthermore, the number of times these same values appear at the same number of moves is counted. When the same value fails to appear periodically, the reading of the picture element data is halted.

The above operations are conducted with respect to all 8 directions, and the total counted number of appearances of identical values is defined as the periodic value of the object picture element 41a. Furthermore, further operations utilize all picture elements 41 of the image data as object picture elements 41a. This type of measurement of the periodic value is conducted for each RGB color component.

In the case shown in FIG. 3, for example in the above operations, when a picture element 41a in the image data is the object, there are cases when the values of the picture elements 41 connected in a horizontal direction (in a rightward direction in FIG. 2) from this picture element 41a are examined and picture elements 41b having identical values are discovered (for example, at intervals of 3 picture elements). In such a case, the number of appearances of identical values appearing at 3 picture element periods is counted, identical operations are conducted with respect to the radial directions, the number of appearances of identical values is counted, the numbers are all added, and the result is set as the periodic value of the object picture element 41a.

Next, the periodic values of all color components are added for each picture element. Then, the sum of the periodic values for each picture element is calculated at a ratio having a peak of 1, and this is defined as the weighting ratio which is used in the weighting which will be described hereinbelow.

The weighting coefficient (periodicity coefficient) $b_i$ is determined by means of the following formula $$b_i = a_i / a_{max}.$$

Here, i indicates each picture element, $a_i$ indicates the sum of the periodic values in each picture element, and $a_{max}$ indicates the largest periodic value $a_i$ (maximum value) among the sums $a_i$ of each periodic value.

The periodicity coefficient $b_i$ obtained in this manner is stored in periodicity coefficient memory mechanism 4.

In addition, in histogram renewal mechanism 21, a periodicity coefficient $b_i$ is allocated to the position of each picture element converted into a uniform color space, and the periodicity coefficients $b_i$ are disposed at the positions of each picture element in the uniform color space.

In addition, in the uniform color space divided into clusters, when the histogram showing the number of picture elements contained in each cluster is renewed in histogram renewal mechanism 21, the various periodicity coefficients $b_i$ of the picture elements contained in each cluster are added, and the sum of these periodicity coefficients $b_i$ becomes the weighting coefficient for each cluster. Then, these weighting coefficients are added to the number of picture elements in each cluster, and this becomes a new histogram. Furthermore, when a discriminant analysis is conducted with respect to the first principal axis, the number of picture elements for each ranking along the first primary axis (i.e. the frequency distribution with respect to the first primary axis) is determined from the histogram produced in the above manner. The number of picture elements contained in each ranking of the first principal axis from this frequency distribution is then divided by the total number of picture elements, a picture element generation probability is determined, and this generation probability is used.

(2) Selection of Representative Colors

In order to select representative colors, first, the color distribution of the image data was disposed in a color space; however, in considering the visual characteristics of color discrimination by human beings, uniform color spaces were used at this time. The above-described CIELUV or CIELAB was used as the equivalent color space. The values of each picture element of the image data comprising RGB data were converted to CIELUV or CIELAB. In the present preferred embodiment, as an example, a detailed explanation will be given of a case in which this conversion is conducted using CIELAB and by means of color conversion mechanism 5.

The conversion of RGB data to CIELAB is carried out according to the following formulas with the inclusion of the XYZ system which was recommended by the CIE in 1931.

$$X = 0.61R + 0.17G + 0.20B \quad (1a)$$

$$Y = 0.30R + 0.59G + 0.11B \quad (1b)$$

$$Z = 0.066G + 1.12B \quad (1c)$$

In the case in which $Y/Yn > 0.008856$:

$$L^* = 116(Y/Yn)^{1/3} - 16 \quad (2a)$$

In the case in which $Y/Yn \leq 0.008856$:

$$L^* = 903.3(Y/Yn) \quad (2b)$$

In the case in which $X/Xn > 0.008856$, $Y/Yn > 0.008856$, and $Z/Zn > 0.008856$:

$$a^* = 500[(X/Xn)^{1/3} - (Y/Yn)^{1/3}] \quad (2c)$$

$$b^* = 200[(Y/Yn)^{1/3} - (Z/Zn)^{1/3}] \quad (2d)$$

In the case in which $X/Xn$, $Y/Yn$, or $Z/Zn$ is less than 0.008856, the items $(X/Xn)^{1/3+cc}$, $(Y/Yn)^{1/3}$, and $(Z/Zn)^{+c,\text{fra}}$ 1/3 in the formulas (2c) and (2d) above are replaced by 7.787 $(X/Xn) + 16/116$, 7.787 $(Y/Yn) + 16/116$, and 7.787 $(Z/Zn) + 16/116$.

Here, the chromaticities of R, G, B, and white are in conformity with the NTSC television standards.

(3) Frequency Distribution of Picture Elements in the CIELAB Color Space

At the stage at which the values of each picture element have been converted from RGB to CIELAB, these values diverge from 8 bit integer values. In order to determine the frequency distribution in the CIELAB color space, it is necessary to determine the ranking numbers along each coordinate axis, to divide the CIELAB color space into clusters, based on the rankings along each coordinate axis, and to determine the number of picture elements contained in these clusters.

An improved version of Watanabe's algorithm (Electronic Data Communication Study Papers D, Vol. J70-D, No. 4, pp. 720–726, April, 1987) was used in the division of the CIELAB color space into the necessary number of colors and the selection of average colors for each color region as representative colors.

As a principal improvement, values converted from RGB 8 bit values into CIELAB values were used in place of the RGB superordinate 5 bits as the original data. By means of this improvement, it was possible to utilize the 8 bit accuracy of the data.

Furthermore, by converting the ranking numbers along each coordinate axis of the initial space which is divided from, for example, RGB 32×32×32 to CIELAB 265×64×64, the ranking numbers on the coordinate axis showing the brightness component $L^*$ are 4 times greater than the ranking numbers along the coordinate axes showing the chromaticity components $a^*$ and $b^*$, so that this brightness component $L^*$ is emphasized. As reported by Kira, et al., (Communications Technology IE83-92, "Adaptive Natural Color Image Display by Means of a Restricted Number of Representative Colors", Kira, Inoue, Fukui), the visual characteristics of human beings are such that sensitivity to brightness distribution is approximately 4 times that of the sensitivity to chromaticity components.

To explain concretely, the image data which are inputted are normally RGB values arranged in order of the picture elements. When an RGB space is used by employing RGB values as coordinates, the RGB space uses R, G, and B as coordinate axes and is a 3-dimensional space having 8 bit values. That is to say, the values are within a range of 0–255 in each coordinate axis thereof. By applying the number of picture elements having the RGB values of a point in the space, a histogram can be determined for each color component.

That is to say, the histogram (r, g, b) equals the total number of picture elements of RGB (r, g, b).

Next, in the case of a histogram of a uniform CIELAB color space, such a histogram is obtained by means of the conversion of the values (r, g, b) of each picture element displayed in terms of the above RGB into the values ($L^*$, $a^*$, $b^*$) on the basis of the formula described above.

That is to say, the histogram ($L^*$, $a^*$, $b^*$) equals the total number of picture elements of CIELAB ($L^*$, $a^*$, $b^*$). However, the RGB values are expressed in terms of 8 bit digital data, so that these data have values which are integral within a range of 0–255, but the ($L^*$, $a^*$, $b^*$) values obtained by means of the above conversion calculation have values which diverge from these integers within a range of 0–255. Accordingly, it is necessary to provide appropriate ranking numbers in the creation of the histogram. Furthermore, at this time, ranking numbers are provided so as to emphasize the brightness component.

In the present preferred embodiment, the brightness, that is to say, the $L^*$ component, is emphasized as described above, and in order to prevent an increase in the data capacity resulting from the conversion into CIELAB, it is necessary to determine the ranking interval of each CIELAB. As each RGB value is expressed in terms of 8 bits, the largest data capacity is set to 8 bits. Accordingly, this means that the brightness $L^*$, which is emphasized, receives a value within a range of 0–255. The $L^*$ component of the picture element obtained by means of the above formula is thus given a value within a range of 0–255 in accordance with its size.

Furthermore, as the brightness component is emphasized by a factor of 4 with respect to the $a^*$ and $b^*$ components, the relationship $a^*$, $b^*:L^*$ has a value of 1:4. That is to say, the $a^*$ and $b^*$ components receive 6 bit values within a range of 0–63.

Here, the calculation of the actual ranking intervals is conducted in accordance with the following formulas when the CIELAB data is transformed to data of less than 8 bits.

L* interval=(L*max−L*min)/(256/m)

a* interval=(a*max−a*min)/(256/n)

b* interval=(b*max−b*min)/(256/n)

The references L* interval, a* interval, and b* interval indicate the ranking intervals of L*, a*, and b*.

The references L*max, a*max, and b*max indicate the maximum values of L*, a*, and b*, respectively.

The references L*min and b*min indicate minimum values of L*, a*, and b*, respectively.

Furthermore, the references m and n vary according to the ratio between the brightness component (L*) and the chromaticity components (a* and b*); in the present preferred embodiment, as the ratio L*:a*, b* has a value of 4:1, the m of the brightness component has a value of 1, while the n of the chromaticity components has a value of 4.

In addition, the CIELAB color space having ranking intervals determined as described above is divided in 3 dimensions by means of the rankings along each coordinate axis, and these divided regions are used as color clusters. A cluster number is then assigned to each cluster. Next, the value of each picture element is replaced by the cluster number of the cluster in which this picture element is contained, and this is stored in cluster picture element memory mechanism 6.

Next, by means of histogram calculation mechanism 7, the frequency distribution for each cluster of the image data is determined.

A brief explanation will be made, with reference to FIGS. 4 and 5, of the case in which the ranking numbers of the coordinate axis indicating brightness are made larger than the ranking numbers of the coordinate axes showing the chromaticities, and representative colors are selected by means of discriminant analysis.

Figure 4:
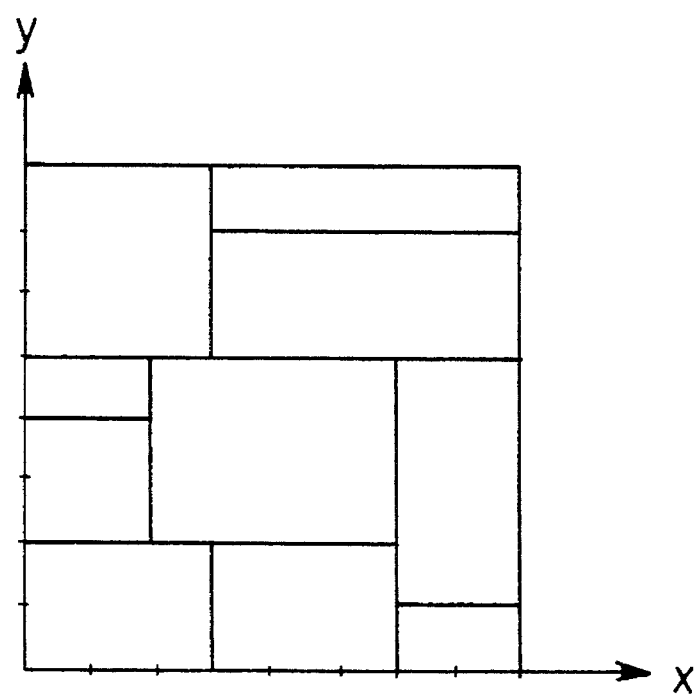
FIG. 4 is a diagram showing a coordinate system which serves to explain the restricted color determination method described above.
Figure 5:
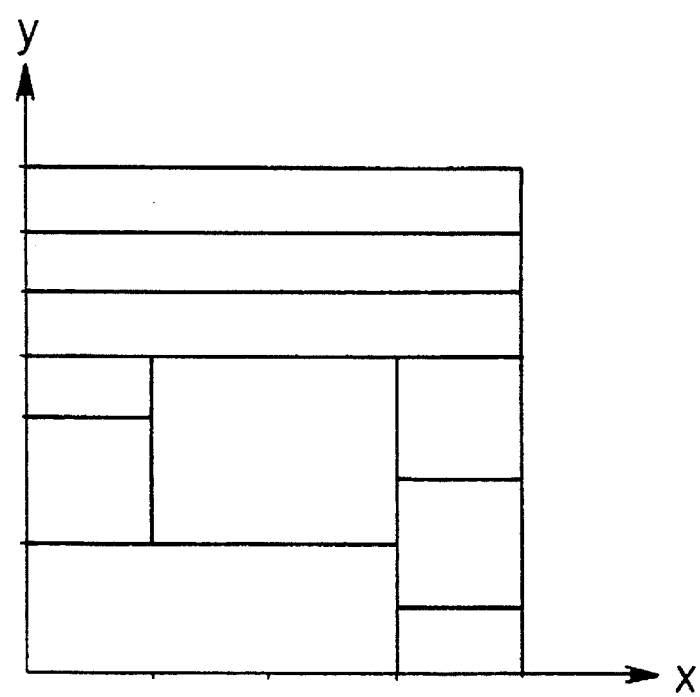
FIG. 5 is a diagram showing a coordinate system which serves to explain the restricted color determination method described above.

In FIGS. 4 and 5, to facilitate ease of understanding, explanation will be given with reference to a 2-dimensional coordinate system having as one axis thereof a coordinate axis indicating the chromaticity in a uniform color space.

First, the y-axis indicates brightness, while the x-axis indicates chromaticity, and in the case in which the ranking numbers thereof are set at 8, the color space is divided by means of discriminant analysis as shown in FIG. 4. By means of setting the ranking numbers along the x-axis to a value of 4, in the case in which the ranking numbers along the y-axis are double those along the x-axis as shown in FIG. 5, the portions of the x-axis which were divisible in FIG. 4 become indivisible, and the number of divisions along the brightness axis increases by this amount. That is to say, in the case in which the average colors of the divided color space are used as representative colors, those colors having the same tint but differing degrees of brightness are selected as representative colors in large numbers, while colors having differing tints are rarely selected, so that representative colors which have emphasized brightness are selected.

(4) Emphasis of Brightness or Chromaticity

In the present preferred embodiment, in the above-described space division system, by means of the emphasis on sampling of the brightness component, attention is paid to the emphasis of portions where the changes in the brightness component are loose, that is to say, to the fact that the division using the brightness direction as the first primary axis is the primary division. Furthermore, on the other hand wherein the brightness component is emphasized, portions and colors having loose brightness variation are specified by means of conductive sampling with respect to the brightness components.

Concretely, in the CIELAB (or in the CIELUV) sampling which is emphasized by a factor of 16 so as to result in 256×16×16 colors is conducted in the brightness direction. The number of restricted colors is set to, for example, a small number such as 100 or the like, and the representative colors are determined by means of the division method (2) described above. By this means, 100 colors which are emphasized, in this case by a factor of 16, with respect to the brightness component are selected. These are the 100 superordinate colors consisting of the emphasized colors of the portions having variation in loose brightness.

As explained above, emphasis coefficient designation mechanism 18 finds the ratio between all coordinate axes with respect to the dispersion in the direction of each coordinate axis of the uniform color space determined by means of average and dispersion calculation mechanism 9, and selects in accordance with this ratio, a multiplying factor (emphasis coefficient) of the ranking numbers of the coordinate axis indicating brightness with respect to the ranking numbers of the coordinate axes indicating chromaticity; this multiplication factor is one of ⅛, ¼, ½, 1, 2, 4, 8, 16, 32, and 64.

In addition, ranking numbers calculation mechanism 19 determines the rankings of each coordinate axis in accordance with the multiplication factors determined in the above manner. For example, in the case in which the multiplication factor of the chromaticity components a* and b* with respect to the brightness coefficient L* is set to 2, the ranking numbers of the coordinate axis of each CIELAB become 256×128×128, and these ranking numbers and the ranking intervals determined by means of these ranking numbers are stored in ranking numbers memory mechanism 20.

(5) Histogram Changes

Using the weighting coefficients of each picture element stored in the above described periodicity coefficient memory mechanism 4 and the ranking numbers stored in ranking numbers memory mechanism 19, the histogram stored in histogram memory mechanism 8 is renewed.

First, an explanation of the renewal of the histogram using the periodicity coefficients stored in periodicity coefficient memory mechanism 4 will be given.

The periodicity coefficients stored for each picture element in periodicity coefficient memory mechanism 4 are disposed at the positions of each picture element converted into a uniform color space, and then the periodicity coefficients of the picture elements contained in each cluster are added by cluster.

Next, a value consisting of the total of the sum of the periodicity coefficients added together by cluster and the number of picture elements of each cluster is used as the number of picture elements of each cluster, and a histogram is created which is then used as a new histogram.

Figure 6:
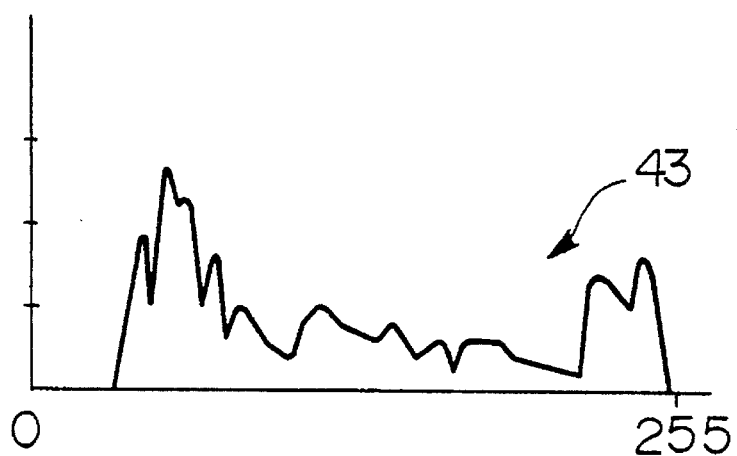
FIG. 6 is a histogram which serves to explain the restricted color determination method described above.
Figure 7:
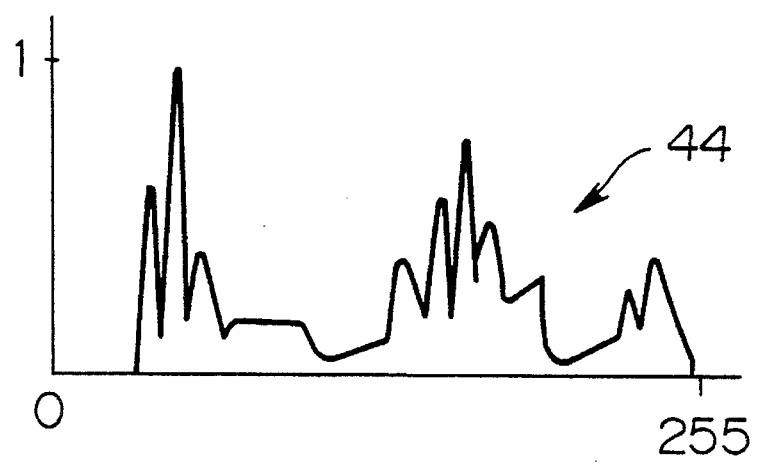
FIG. 7 is a graph which serves to explain the restricted color determination method described above.
Figure 8:
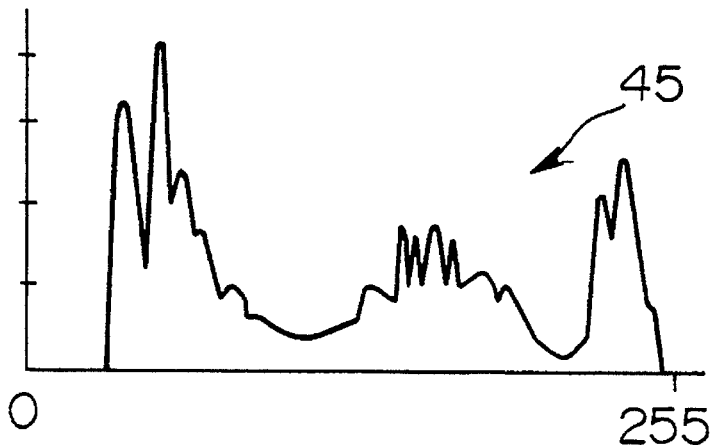
FIG. 8 is a histogram which serves the purpose of explaining the restricted color determination method described above.

That is to say, by means of the addition of the histogram showing the sum for each cluster of the coefficients 44 stored in the periodicity coefficient memory mechanism 4, to the histogram 43 (in actuality, this is a histogram in a uniform color space, i.e. in a 3-dimensional space; however, in order to facilitate explanation, a 1-dimensional histogram is used) stored in the histogram memory mechanism 8, as shown in FIGS. 6 and 7, it is possible to obtain-the weighting corrected histogram 45 shown in FIG. 8. This histogram is then used for the selection of representative colors by means of discriminant analysis, which is subsequently conducted and discussed hereinbelow.

Furthermore, histogram renewal mechanism 21 reconstructs the histogram using the ranking numbers stored in the above-described ranking numbers memory mechanism 20.

In histogram calculation mechanism 7, a histogram was created using ranking numbers in which the chromaticity component was emphasized by a factor of 4 with respect to the brightness component, irrespective of the color tone of the image data. However, the ranking numbers are determined by the multiplication factor designated by means of the emphasis coefficient designation mechanism 18.

In addition, the uniform color space is redivided into new clusters by means of the new rankings, and the number of picture elements of each new cluster is made into a new histogram.

Furthermore, when emphasis is also to be conducted in addition to weighting by means of the above-described periodicity coefficients, the sum of the periodicity coefficients of each new cluster is used as a weighting coefficient, the weighting coefficient is then normalized, and then multiplied by the number of picture elements of each new cluster, and added to the number of picture elements of each new cluster, and a new histogram is made. Subsequently, the histogram stored in histogram memory mechanism 8 is updated to this new histogram obtained by the above-described manner.

(6) Selection of Representative Colors by Means of the Discriminatory Method of Analysis The selection of representative colors by means of the discriminatory method of analysis of the present preferred embodiment is basically identical to that of the above-described background art; using the histograms of each color component, thresholds are found and the color space is successively divided into a plurality of color regions at these thresholds. However, in the present preferred embodiment, a discriminant analysis is conducted using histograms which have been reconstructed by means of weighting by periodicity and the ranking numbers which have been emphasized.

Here, a determination method for the thresholds $T_i$ by means of discriminant analysis will be explained.

If the number of picture elements of a region S is represented by N, and the number of picture elements in a freely selected ranking i of 1 coordinate axis is represented by $n_i$, the probability of generation $q_i$ is shown by the formula given hereinbelow (number 1). At this time, the number of picture elements are determined from the histogram which has been renewed in the manner described above by means of histogram renewal mechanism 21.

That is to say, values equivalent to the sum of the number of picture elements of each new cluster divided by means of the new ranking numbers and the weighting coefficients are set as the number of picture elements in each cluster, and a number of picture elements having added thereto the number of picture elements in each cluster contained in a freely selected ranking along 1 coordinate axis is used as the number of picture elements $n_i$.

$$q_i = n_i/N \quad [1]$$

Then, assuming that a section [a, b] has been divided into 2 sections $C_1$ [a, k] and $C_2$ [k+1, b] based on a value k on a coordinate axis (a value used as a ranking unit), in the case in which the generation probability of the picture elements in both sections is set to $w_1$, $w_2$, the average value is set to $m_1$, $m_2$, and the dispersion is set to $s_1^2$, $s_2^2$, a value k on the coordinate axis is set so as to minimize the weighting dispersion sum $s_w^2$ given by the formula given hereinbelow (number 2).

$$s_w^2 = w_1 s_1^2 + w_2 s_2^2 \quad [2]$$

The minimization of the weighting dispersion sum $s_w^2$ is equivalent to the maximization of the dispersion $s_B^2$ between the 2 sections obtained in the formula given hereinbelow (number 3).

$$s_B^2 = w_1 w_2 (m_1 - m_2)^2 \quad [3]$$

The value k which maximizes $s_B^2$ (that is to say, the thresholds $T_i$ which are to be determined) can be successively determined as shown in the formula given hereinbelow (number 4).

$$[4] \; s_B^2(k^*) = \max_{a \leq k \leq b} s_B^2(k)$$

$$s_B^2(k) = (m_T w(k) - m(k))^2 / w(k)[1 - w(k)]$$
$$w(k) = w(k-1) + q_k$$
$$m(k) = m(k-1) + k q_k$$

Here, $m_T$ indicates a total average and is shown in the formula given hereinbelow (number 5).

$$[5] \; m_T = \sum_{a \leq i \leq b} q i^i$$

In the above manner, it is possible to determine the threshold $T_i$ of each color component.

In addition, by means of the threshold $T_i$ thus obtained, first, the color space is divided into 2 regions; however, in each color component, the coordinate axis of the color component in which the dispersion $s^2$ was greatest was used as the first principal axis, and at the position on this first principal axis corresponding to the threshold $T_i$ of this color component, the color space was divided into 2 color regions by a dividing plane perpendicular to the first principal axis.

Next, the sum $s_w^2$ of the weighting dispersions of each color region resulting from this division was determined, these were compared among color regions, and the color region having the largest sum $s_w^2$ of the weighting dispersions was used as the next region to be divided. Then, in this color region, a threshold $T_i$ and a first principal axis were determined, as was the case when the color space was divided, and this color region is then further divided into 2 color regions.

Next, among all color regions resulting from divisions, the color region having the largest sum $s_w^2$ of the weighting dispersions is found, and the division into 2 sections of the color region which was thus found is repeated as stated above.

Next, when the number of color regions resulting from the divisions becomes equal to the number of representative colors in which the display is to be conducted, the division is stopped.

Next, the average values of each color component in each color region are converted from CIELAB to RGB by means of a reverse color conversion mechanism 22 and used as representative colors.

Then, these representative colors are recorded as color codes in color map 30a of color map display device 30. The color distribution in the color space of the color image data which are to be displayed and each color region are brought into correspondence, and a color which is close to the original color of each picture element is allocated to the picture elements of the image data from color map 30a as a color code. In this manner, image data having color codes allocated to each picture element and restricted colors are displayed in display 30b of the color map display device 30 having a color map 30a in which the color codes are recorded.

Furthermore, it is possible to store the restricted color image data in memory mechanisms and the like. An image which has been image processed can be instantaneously displayed on display 30*b*, and the memory capacity of the restricted image data is reduced in comparison with that of the image data of the original natural image, so that a device having a small memory capacity can easily handle this data.

(7) Determination of Representative colors by Means of Repetition of the Above Operations In the restricted color determination method of the present preferred embodiment, the selection of the restricted colors determined as described above is repeatedly conducted for the selected representative colors, and thereby, the representative colors are reduced in stages.

That is to say, repetition control mechanism 17 uses the image displayed in terms of the representative colors selected in the above-described manner as original image data, and again conducts selection of representative colors by means of the above-described operations. By means of repeating this process a set number of times, the number of representative colors is finally reduced to the necessary number.

Furthermore, when repeatedly selecting representative colors in each repetition, a histogram is revised by means of the periodicity coefficient calculation mechanism 3 and ranking numbers calculation mechanism 19. By means of the histogram renewal mechanism, the histogram is weighted with respect to those portions in which the color variation is loose, and the brightness or the chromaticity is emphasized.

Accordingly, with respect to statistical characteristics such as the chromaticity distribution and the brightness distribution, representative colors which are suited to the statistical characteristics of the image data are selected in the same manner as in the adaptive method by means of adjustments to the image data and reductions in the representative colors.

As stated above, the restricted color determination method of the present preferred embodiment specifies portions in which the color variation is loose by means of the periodicity of the subordinate 3 bits of the image data. In using this periodicity as a coefficient, this method weights and revises the color distribution of the image, selects a large number of colors from portions in which the color variation is loose, and creates more ranking numbers for the coordinate axes indicating brightness than for the coordinate axes indicating chromaticity. In addition, by means of selecting a large number of colors having differing degrees of brightness, in line with the visual characteristics of human beings, this method prevents the occurrence of pseudo color contouring.

Furthermore, in comparing the dispersion on each coordinate axis of the brightness and the chromaticity, it is possible to select representative colors which are suited to the characteristics of the image data by further emphasizing the brightness with respect to image data in which the brightness variation is large, and emphasizing the chromaticity with respect to images in which the brightness variation is small and which have a large number of tints.

Furthermore, by means of reducing the number of representative colors in stages while repeatedly conducting the above operations, the measurement of the periodicity of the subordinate 3 bits and the comparison of the dispersion on each coordinate axis of the brightness of the chromaticity are repeated. By means of the repeated revision of the histogram in accordance therewith, it is possible to reduce the representative colors to those which are suited to the statistical characteristics of the image data.

It is also possible to construct these processes as a program on a commercially available computer, and thus to execute the processing.

Furthermore, it is not absolutely necessary to set the memory capacity corresponding to each picture element of the original image data to 24 bits. In addition, it is not necessary to set the subordinate bits used in the specification of the color variation to the subordinate 3 bits. Also, it is possible to alter the number of subordinate bits which are used in accordance with the memory capacity allotted to each picture element of the original image data.

Furthermore, a certain amount of processing time is necessary in order to reduce the number of colors by means of the present invention. However, when the compressed image which is obtained thereby is displayed, decoding processing is not necessary so that independent of the machine or system, it is possible to instantaneously display the compressed image having restricted colors. By this means, the restricted color determination method can be expected to be used in many manufacturing fields.

In the present preferred embodiment, the periodic values of image data displayed in terms of RGB values were determined, and histograms of the image data converted into a CIELAB color space were revised. However, it is also possible to revise a histogram of the image data displayed in terms of RGB values using the above-described periodic values, and by means of conducting a discriminant analysis on the display colors of the image data in RGB values which were thus revised to reduce the number of display colors.

What is claimed is:

1. A color variation specification method comprising the steps of:

reading least significant bits of digital data expressing values of the three primary colors of each picture element of image data, wherein the three primary colors are red, green and blue;

determining a periodicity at which identical values are exhibited in said least significant bits of said picture elements disposed in a connected manner in said image data; and determining relative strengths of color variations from periodicity data.

2. A restricted color determination method comprising the steps of:

reading least significant bits of digital data expressing values of the three primary colors of each picture element of image data, wherein the three primary colors are red, green and blue;

determining a periodicity at which identical values are exhibited in said least significant bits of said picture elements disposed in a connected manner in said image data;

determining weighting coefficients based on periodicity data;

conducting weighting revision of a histogram of each of said picture elements of said image data in a 3-dimensional space by means of said weighting coefficients;

determining representative colors by utilizing a discriminant analysis with respect to the revised histograms; and approximating said image data by means of said representative colors.

3. A restricted color determination method in accordance with claim 2, wherein said periodicity data represent totals of a number of appearances of identical values in said least significant bits occurring periodically and in succession within a prescribed interval in said picture elements disposed in radial directions from each of said picture elements of said image data.

4. A restricted color determination method comprising the steps of:
   a) disposing, based on values of the three primary colors red, green, and blue, each picture element of image data in a uniform color space having one coordinate axis representing a brightness component and two coordinate axes representing chromaticity components;
   b) setting a ranking number in a coordinate axis indicating a brightness component of said uniform color space, setting a ranking number, different from the ranking number set in the coordinate axis indicating a brightness component, in each of the two coordinate axes indicating chromaticity components of said uniform color space, and dividing said uniform color space by means of the ranking numbers set in each of said coordinate axes;
   c) determining a histogram of picture element distribution in the divided uniform space;
   d) determining representative colors by utilizing a discriminant analysis with respect to said histogram; and
   e) approximating said image data by said representative colors.

5. A restricted color determination method in accordance with claim 4, wherein more of said ranking numbers exist in said coordinate axis indicating said brightness component of said uniform color space than said ranking numbers exist in said coordinate axes indicating chromaticity components in said uniform color space.

6. A restricted color determination method in accordance with claim 4, wherein more of said ranking numbers exist in said coordinate axes indicating chromaticity components of said uniform color space than said ranking numbers exist in said coordinate axis indicating said brightness component in said uniform color space.

7. A restricted color determination method in accordance with claim 4, wherein, in said step (b) for setting a ranking number, when said ranking numbers in said coordinate axis indicating said brightness component of said uniform color space are set so as to be different from said ranking numbers in said coordinate axes showing said chromaticity components of said color space, with respect to a distribution of each picture element in said image data in said uniform color space, dispersions in each coordinate axis direction of said uniform color space are determined, ratios of said dispersions between each coordinate axis are determined, and in accordance with said ratios, a multiplying factor of said ranking numbers of said coordinate axis indicating brightness is determined with respect to said ranking numbers of said coordinate axes indicating chromaticity.

8. A restricted color determination method in accordance with claim 7, which further comprises the steps of:
   reading least significant bits of digital data expressing values of three primary colors of each said picture element of said image data, wherein the three primary colors are red, green and blue;
   determining a periodicity at which identical values are exhibited in said least significant bits of picture elements disposed in a connected manner in said image data;
   determining weighting coefficients based on periodicity data; and
   revising said histogram by weighting by means of said weighting coefficients,
   and wherein the steps described above are performed prior to step (b) utilizing a discriminant analysis with respect to said histogram.

9. A restricted color determination method in accordance with claim 7 wherein, with respect to said approximated image data approximated by means of representative colors in said step (e), said steps (a), (b), (c), (d), and (e) are repeatedly performed in order, thereby said representative colors are further reduced.

10. A restricted color determination method in accordance with claim 9 which further comprises the steps of:
    reading least significant bits of digital data expressing values of three primary colors of each said picture element of said image data, wherein the three primary colors are red, green and blue;
    determining a periodicity at which identical values are exhibited in said least significant bits of picture elements disposed in a connected manner in said image data;
    determining weighting coefficients based on said periodicity data; and
    revising said histogram by weighting by means of this weighting coefficient prior to said step (d).

11. An apparatus for determining restricted color, comprising
    data extraction means for extracting least significant bits of digital data expressing values of three primary colors of each picture element of image data, wherein the three primary colors are red, green and blue;
    periodicity calculation means for determining a periodicity at which identical values appear in said subordinate bits in said picture elements disposed in a connected manner in an image;
    histogram calculation means for producing a histogram showing an appearance frequency of each color in a color image;
    histogram renewal means for conducting weighting revision of said histogram based on periodicity data determined by said periodicity calculation means; and
    representative color determination means for determining representative colors for the purpose of approximation of image data in terms of restricted colors by utilizing a discriminant analysis with respect to said histogram which was weighting revised by said histogram renewal mechanism.

12. An apparatus for determining restricted color comprising:
    histogram calculation means for disposing each picture element of image data in a uniform color space, for setting ranking numbers in a coordinate axis indicating a brightness component in said uniform color space, for setting ranking numbers, different from the ranking number set in the coordinate axis indicating a brightness component, in each of coordinate axes indicating chromaticity components of said uniform color space, and determining a histogram of each of said picture elements of said image data in each coordinate axis; and
    representative color determination means for conducting a discriminant analysis with respect to said determined histograms and determining representative colors.

13. An apparatus for determining restricted color in accordance with claim 12, further comprising emphasis coefficient designation means for determining dispersions in each direction of the coordinate axis of said uniform color space for determining ratios of said dispersions between each coordinate axis, and for designating in accordance with said ratios a multiplying factor of ranking numbers of said coordinate axis indicating brightness with respect to said ranking numbers of said coordinate axes indicating chromaticity, at the time of determination of a histogram by means of said histogram calculation means and with respect to a distribution of each picture element in said image data in said uniform color space.

14. An apparatus for determining restricted color in accordance with claim 13, further comprising repetition control means for controlling said emphasis coefficient designation means, said histogram calculation means, and said representative color determination means at the time of the display by means of a smaller number of representative colors of image data expressed in terms of representative colors determined by means of said representative color determination means, by means of repetition of the operations of said emphasis coefficient designation means, said histogram calculation means, and said representative color determination means.

15. An apparatus for determining restricted color in accordance with claim 13, comprising:

periodicity calculation means for determining periodicity data indicating an appearance of identical values in subordinate bits with respect to digital data expressing three primary colors of said image data; and histogram renewal means for weighting revision of a histogram determined by means of said histogram calculation means, based on said periodicity data.

16. An apparatus for determining restricted color in accordance with claim 15, further comprising repetition control means for controlling said emphasis coefficient designation means, said histogram calculation means, said periodicity calculation means, said histogram renewal means, and said representative color determination means at the time of the display by means of a smaller number of representative colors of image data expressed in terms of representative colors determined by means of said representative color determination means, by means of repetition of the operations of said emphasis coefficient designation means, said histogram calculation means, said periodicity calculation means, said histogram renewal means, and said representative color determination means.

* * * * *

UNITED STATES PATENT AND TRADEMARK OFFICE
CERTIFICATE OF CORRECTION

PATENT NO. : 5,608,851
DATED : March 4, 1997
INVENTOR(S) : Yuichi KOBAYASHI

It is certified that error appears in the above-indentified patent and that said Letters Patent is hereby corrected as shown below:

<u>Column 11</u>

Lines 47 and 48, "the items $(X/Xn)^{1/3+cc}$, $(Y/Yn)^{1/3}$, and $(Z/Zn)^{+c,fra\ 1/3}$" should be --the items $(X/Xn)^{1/3}$, $(Y/Yn)^{1/3}$, and $(Z/Zn)^{1/3}$--.

Signed and Sealed this

Twenty-second Day of July, 1997

Attest:

BRUCE LEHMAN

*Attesting Officer*     Commissioner of Patents and Trademarks